July 20, 1965 R. D. RUMSEY ETAL 3,195,421
ROTARY HYDRAULIC ACTUATOR AND SEALING MEANS THEREFOR
Filed Feb. 4, 1963 2 Sheets-Sheet 1
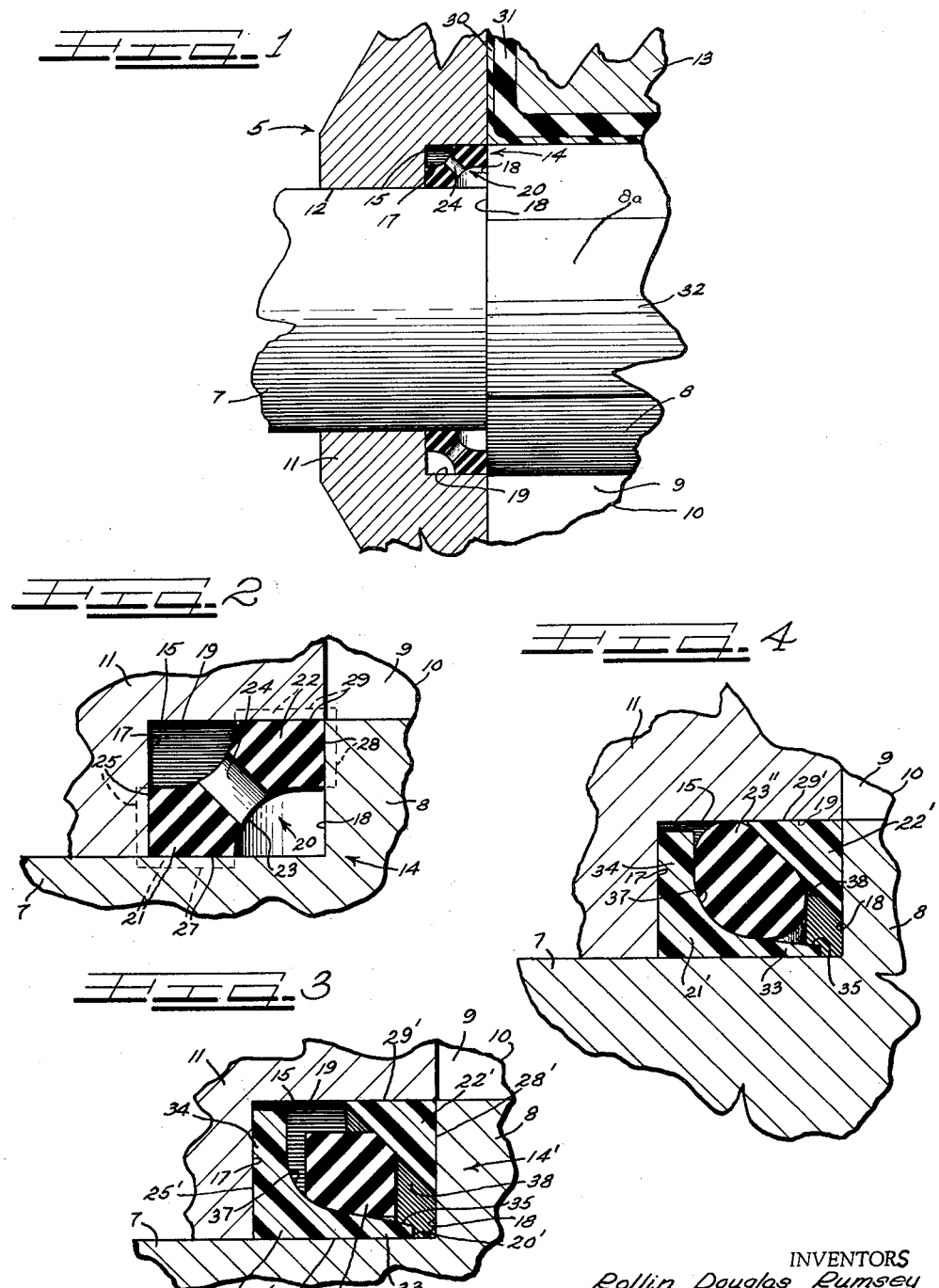
INVENTORS
Rollin Douglas Rumsey
John C. Schultz
BY
ATTORNEYS

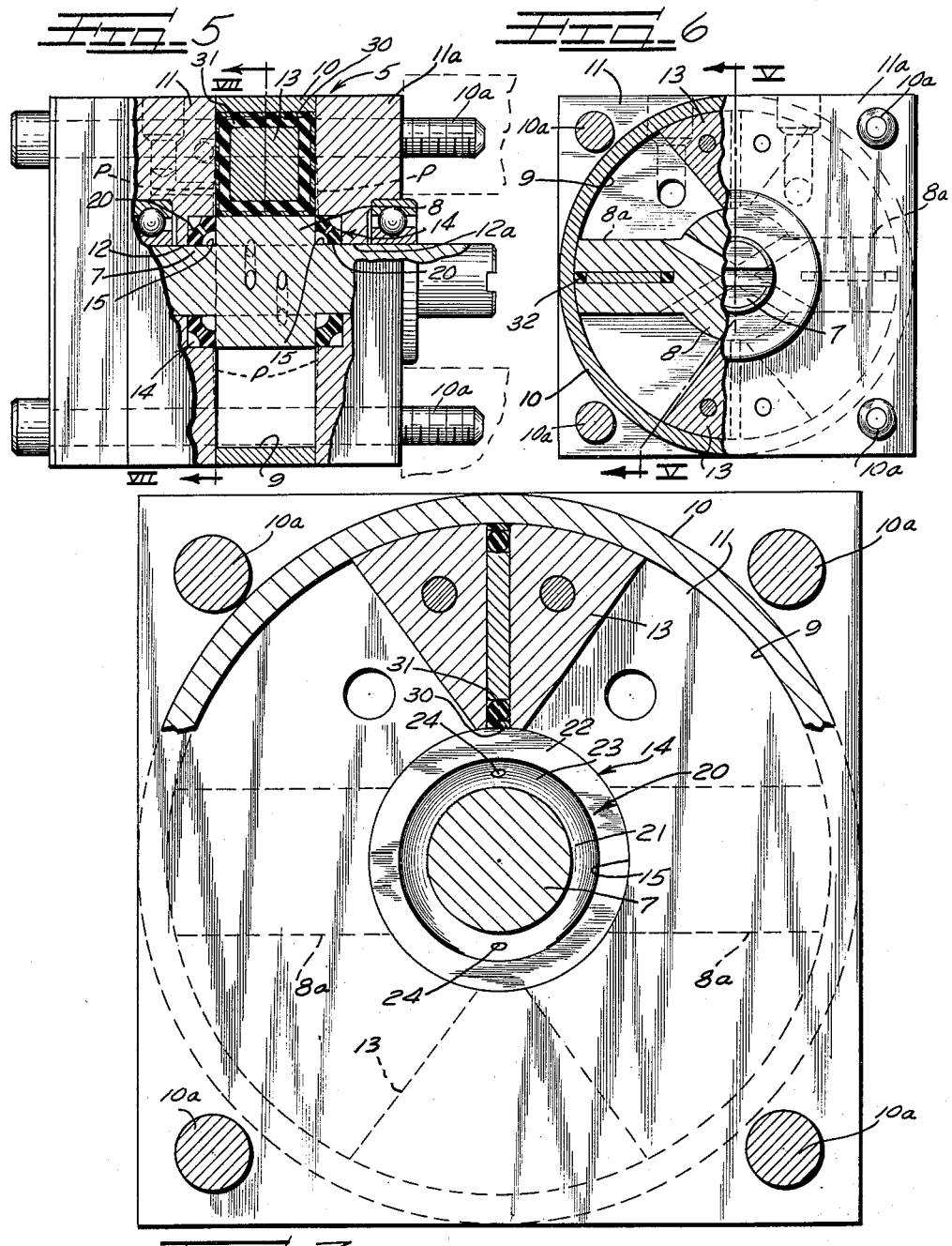

United States Patent Office 3,195,421
Patented July 20, 1965

3,195,421
ROTARY HYDRAULIC ACTUATOR AND
SEALING MEANS THEREFOR
Rollin Douglas Rumsey, Buffalo, and John C. Schultz,
Cheektowaga, N.Y., assignors to Houdaille Industries,
Inc., Buffalo, N.Y., a corporation of Michigan
Filed Feb. 4, 1963, Ser. No. 255,779
18 Claims. (Cl. 92—122)

This invention relates to improvements in rotary vane hydraulic devices and the like, and more particularly concerns the sealing of such devices against external leakage as well as against internal leakages.

In rotary vane hydraulic devices such as rotary actuators wherein one or more vanes on a rotary wing shaft operate in association with abutments in a cylindrical working chamber there is a tendency for leakage to occur internally over the wing shaft hub in normal operation and thus results in poor hydraulic efficiency. On the other hand, excessive loading of seals in this area creates undue frictional resistances, requires excessive power consumption and results in excessive wear.

Although leakage during normal operation over the wing shaft hub should be avoided, pressure relief should be afforded in the presence of excessive internal pressures such as may develop due to high line surge pressures, jerky operation, impact load, sudden valve closings and the like. These extremely high pressure conditions may be of such magnitude as to rupture or break some part of the actuator.

Further, external leakage, that is leakage along the shaft that projects through the end cover of the device, is a problem that must be met, and has generally required a separate seal between the end cover and the shaft.

An important object of the present invention is to provide in a rotary vane hydraulic device a new and improved combination sealing means for preventing both internal and external leakage.

Another object of the invention is to provide a new and improved, simplified, highly efficient rotary vane hydraulic device construction equipped for both internal and external sealing against leakage by means of a sealing structure accommodated in a single groove.

A further object of the invention is to provide new and improved sealing means for a rotary vane hydraulic device at the junction of the shaft hub, the end cover and the abutment means of the device.

Still another object of the invention is to provide a new and improved sealing structure for rotary hydraulic devices constructed and arranged for preloading to provide a large pressure range.

Yet another object of the invention is to provide new and improved sealing structure for sealing diagonally opposite joints in a seal chamber.

It is also an object of the invention to provide in rotary vane hydraulic devices and the like improved seal structure which will function efficiently as a chamber-to-chamber shuttle or relief valve under excessive internal pressure conditions.

Other objects, features and advantages of the present invention will be readily apparent from the following detailed description of certain preferred embodiments thereof taken in conjunction with the accompanying drawing, in which:

FIGURE 1 is a fragmentary sectional elevational detail view longitudinally through a hydraulic rotary actuator illustrating an embodiment of the invention;

FIGURE 2 is a substantially enlarged fragmentary sectional view showing in greater detail the novel combination shaft and hub seal of FIGURE 1;

FIGURE 3 is a fragmentary sectional view similar to FIGURE 2 but showing a modification of the seal;

FIGURE 4 is another similar view showing a further modification of the seal;

FIGURE 5 is a side elevational view, partially in section of the full rotary actuator, and with the section taken substantially on the line V—V of FIGURE 6;

FIGURE 6 is an end view of the actuator of FIGURE 5, partially in section; and

FIGURE 7 is an enlarged sectional elevational detail view taken substantially on the irregular section line VII—VII of FIGURE 5.

A rotary hydraulic device 5 (FIGS. 1 and 5–7) such as a rotary actuator includes a rotary wing shaft 7 having a cylindrical hub portion 8 carrying rigidly one or more wings or vanes 8a oscillatably rotatable within a cylindrical working chamber 9 defined within a housing 10 having at least at one end an end cover 11 closing the working chamber, and in this instance an opposite end cover 11a. As is well known in this art, the end cover 11 is adapted to be secured to the other components of the housing 10 in any suitable manner as by means of bolts or screws 10a. Some rotary hydraulic devices of this type have a closure 11 at only one end of the housing while others, such as shown in FIG. 5, have a similar closure 11a at the opposite end of the housing. At least one end portion of the wing shaft 7 projects from the working chamber 9 through a journal bore 12 centrally through the end closure 11. Herein, the opposite end portion of the wing shaft projects through a journal bore 12a in the end closure 11a. One of the wing shaft or the housing is attached to one component of apparatus with which the device is operatively associated and the other is attached to another component of the apparatus, whereby in operation the wing shaft 7 and the housing 10 are relatively oscillatably rotatable, with actuating fluid under pressure introduced into the working chamber 9 through a suitable pressure fluid system in well known manner and acting between the wing shaft vanes 8a and stationary abutments 13 in the working chamber effecting the desired relative rotation of the wing shaft and housing where the device comprises a rotary actuator.

According to the present invention, improved sealing means 14 are provided against both internal leakage over the hub 8 between the sub-chambers defined between the vanes 8a and the abutments 13, and against external leakage past the portions of the shaft 7 which project through the journal bores 12 and 12a. To this end, the end closure members 11 and 11a are each provided with a counterbore groove 15 provided with a base surface 17 opposing an end surface or face 18 of the hub 8, and a cylindrical surface 19 of a diameter substantially equal to the diameter of the perimeter of the hub 8. Thereby, an annular seal chamber is provided within which is mounted an annular sealing member 20.

In a desirable form, as shown in FIGURES 1, 2, 5 and 7, the sealing member 20 comprises a one-piece ring made from a suitable elastomeric material. Because of its excellent wear and abrasion resistance, the material from which the sealing ring 20 is made is desirably a urethane compound.

As best seen in FIGURES 1 and 2, the annular seal structure 20 comprises respective radially inner and outer annular sealing thrust shoulder portions 21 and 22 and an integral connecting spring loading portion 23 by which the shoulder portions are biased in the assembly within the seal chamber 15 to thrust in diagonally opposite directions relative to a radial plane. In the preferred form shown, the connecting spring loading portion 23 is of thinner section than either of the thrust shoulder portions 21 and 22 but substantially symmetrically related thereto, enabling ready conformability of the thrust shoulder portions to the opposing sealing surfaces within the seal chamber 15 and also affording substantial sub-chambers at each side of the annular seal structure member 20 within the seal chamber 15. Diagonal holes 24 through the connecting spring loading portion 23 are provided to establish predetermined spring loading, the number of holes being based on the desired loading. The holes 24 also serve as fluid passages to equalize pressure on both sides of the seal member 20.

In its unmounted condition, the seal ring member 20 is dimensioned to have a predetermined greater length as well as a smaller inside diameter and a larger outside diameter than the corresponding dimensions within the seal chamber 15, as indicated in dash outline in FIGURE 2, so that when compressed to its confined relationship within the seal chamber 15, the desired spring loading of the sealing thrust shoulder portions 21 and 22 will be attained. On the inner shoulder portion 21 an axially facing annular sealing face 25 of substantial width thrusts sealingly against the sealing chamber surface or face 17, and a radially inwardly facing annular sealing face 27 of substantial width thrusts sealingly against the wing shaft 7, with the juncture of the sealing faces thrusting into the joint or juncture corner between the shaft and the closure member surface 17. Diagonally opposite, an axially inwardly facing annular sealing surface 28 of substantial width on the sealing shoulder 22 sealingly engages against the opposing hub end face 18, and a radially outwardly facing annular sealing face 29 of substantial width thrusts sealingly against the sealing chamber groove surface 19, with the apex at juncture of the sealing faces 28 and 29 thrusting into the corner of the sealing chamber at junction of the sharp corners of the hub 8 and the closure member 11 at the working chamber 9. Thus, while the seal member 20 is completely confined within the seal chamber 15, the spring loaded thrust shoulder portion 21 provides an effective external seal and the thrust shoulder portion 22 affords an effective internal seal against leakage.

An especially desirable relationship is afforded at the point or apex of intersection of the seal surfaces 28 and 29 and the corner joint formed by the seal chamber surfaces 18 and 19 which is a line of no substantial area. At the opposite or working-chamber side of said corner joint is a corner defined by intersection of the inner face surface of the closure member 11 and the cylindrical chamber surface of the hub 8. A seal 30, which may be made of Teflon or nylon or like plastic sealing material, engages in said corner and also engages an O-ring sealing member 31 carried by each of the abutments 13 which subdivide the working chamber 9. Also engaging into such corner is a seal 32 carried by each of the vanes 8a. By this arrangement, wherein the plastic seals in the respective opposite joint corners are at a point of no substantial area, quite effective sealing of the opposing seals is attained without any interference by rubbing of the seals against one another.

Within the normal operating pressure range, the end sealing structure 14 and the seals 30, 31 and 32 within the working chamber area quite efficiently resist leakage between the sub-chambers of the working chamber 9. However, should there be any excessive pressure surges, impact loads, sudden closing of valves, or the like, tending to excessive hoop tension, slight axial resilient yielding of either or both of the end closures 11 and 11a as shown in a highly exaggerated illustrative manner by dash lines P in FIGURE 5, will permit pressure relief into the seal chamber 15 for equalizing and relieving pressure by escape of the excessive pressure into the lower pressure area or areas of the working chamber 9. Any pressure leaking into the annular seal groove chamber 15, however, tends to increase the sealing radially inward and axially outward thrust of the sealing shoulder portion 21 of the seal member 20 and thus assures even tighter sealing engagement of the convergently related sealing faces 25 and 27 thereof with the opposing closure cap or member and shaft surfaces to prevent external leakage. This is implemented by the flange-like annular projections of the shoulder portion 21 at each side of the seal member toward which increased thrust is imposed by action of the pressure fluid supplemental to the spring thrust bias action of the connecting spring loading portion 23. Therefore, the sealing structures 14 cooperate with the closures 11 and 11a to provide respective pressure relief valves for the device and protect it against sudden pressure surges or shock and at the same time effectively seal it against external leakage.

In the embodiment of FIGURE 3, details of the rotary vane hydraulic device are identical with FIGURES 1 and 2, inclusive of the seal counterbore groove chamber 15 and the several surfaces defining the same, in this instance, as in FIGURES 1 and 2, being of annular form and of rectangular cross-section but other details of the sealing means 14' are modified to provide a three-piece seal structure 20', the elements of which are identified by primed reference numerals corresponding to the same elements of the one-piece seal structure 20 of FIGURES 1 and 2. Thus, in FIGURE 3, a separately formed external leakage sealing thrust shoulder portion 21', and opposite separately formed internal leakage sealing thrust shoulder portion 22', and an intermediate oppositely biasing spring loading separately formed portion 23' are provided. In addition to providing an even more positive external leakage or shaft seal, the seal assembly 20' enables the components to be made from selectively different materials as may be preferred. For example, the shoulder portions 21' and 22' may be made from a material having a low coefficient of friction such as tetrafluoroethylene resin, known as Teflon, containing or filled with glass fibers for reinforcement, while the spring loading portion 23' may be made from suitable rubber such as synthetic rubber of preferred durometer hardness to afford calculated spring loading resilience and resistance to deflectional displacement relative to the shoulder portions 21' and 22'.

In a desirable construction, the sealing shoulder portion 21' is constructed as a ring comprising a sleeve-like axially extending flange portion 33 having its inside diameter sealing face 27' of normally smaller diameter than the shaft diameter and stretched into sealing engagement therewith. In addition, the sealing ring portion 21' has a generally radially extending flange 34 which provides the broad sealing face 25' engaging the seal chamber groove base surface 17 and joining the seal face 27' on a dihedral angle complementary to the corner defined by juncture of the groove face 17 and the perimeter of the shaft 7. In line, generally bisecting the dihedral angle of the seal surfaces, the shoulder ring portion 21' is of thickest mass or body section and toward which the spring loading ring portion 23' thrusts under compression in the assembly.

In a preferred form, the spring loading ring portion 23' is initially of substantially rectangular, and desirably square cross-section with its respective faces parallel to the surfaces defining the seal chamber 15. By having a normally smaller inner diameter than the opposing outside diameter of the shoulder ring portion flange 33 in the assembly, the spring loading ring portion 23' is pressed into compressing relation about the flange 33. Assembly is facilitated and an increasing sealing thrust force at a rate which is a function of increase in hydraulic pressure is attained by having the outside diameter surface of the flange 33 in the form of a beveled or sloping ramp face 35 extending from the tip of the flange 33 and affording a progressively increasing thickness in the flange to the thicker body portion of the sealing member 21' and merging with a large radius groove surface 37 between the flanges 33 and 34. In the preferred construction, the radial annular flange 34 is of substantially thicker section than the thinnest section of the flange 33, and the surface of the flange 34 which merges with the groove 37 may be substantially parallel to the sealing surface 25'. In length, the radial flange 34 is preferably just slightly smaller in outside diameter than the diameter of the cylindrical wall 19 defining the seal chamber 15. Through this arrangement, the spring loading ring portion 23' is adapted to cradle in the groove 37 in the assembly and thrust not only against the sealing flange 33 but also diagonally toward the meeting dihedral angle of the sealing faces 25' and 27' into the engaged seal chamber corner.

Opposite to the shoulder portion ring member 21', the spring loading portion ring 23' thrusts against a diagonal surface 38 opposing it on the sealing shoulder portion member 22' which is desirably of triangular cross-section and with the sealing faces 28' and 29' of substantial width sealingly abutting the end face 18 and the cylindrical chamber groove wall 19. The initial or normal diameter of the annular sealing face 29' is preferably slightly greater than the diameter of the groove surface 19 to assure an initial snug sealing engagement therebetween. Diagonal thrust of the elastomeric spring loading ring portion 23' against the diagonal surface 38 effects sealing thrust toward the dihedral angle apex juncture of the sealing faces 28' and 29' and into the corner defined at the juncture of the surfaces 18 and 19, effecting the same desirable sealing relationship as described in connection with the thrust shoulder portion 22 in FIGURES 1 and 2.

Under normal operating conditions, the assembled stretched and diagonally compressed relation of the spring loading ring portion 23' relative to the diagonally opposite and opposed sealing shoulder ring portions 21' and 22' causes the loading ring portion 23' not only to thrust the internal leakage preventing seal ring member 22' into its corner of the seal chamber 15 but also acts to thrust the generally L-shape cross-section shoulder ring portion member 21' into its corner of the seal chamber for sealing against external leakage, with special compressive action against the axially extending shaft-engaging elongated sealing flange 33 by virtue of the stretched relationship of the loading ring about such flange, the slope of the engaged surface 35 tending to maintain the loading ring orientation about the flange 33. This normal operating relationship affords excellent results within the normal operating pressure range within the device, without excessive seal pressures. However, upon the occurrence of excessively high hydraulic pressures which force from the working chamber 9 into the seal chamber area on the side of the loading ring 23' nearest the hub end face 18, and while the seal chamber 15 is functioning as a relief shuttle valve, pressure fluid displacement of the loading ring 23' causes it to ride the cross-sectionally concave arcuate surface 37 into increasingly seal thrusting relation toward not only the body of the seal shoulder ring member 21' but also the flange 34 thereof and the thicker portion of the flange 33, while the hydraulic fluid pressure works against the portion of the flange 33 projecting marginally beyond the loading ring member 23'. Thus, the sealing force of the seal assembly for preventing external leakage increases at a rate which is a function of the increase in hydraulic pressure. Upon relief of the excess pressure, the loading ring member 23' tends to return to its normal operating relation to the shoulder ring members 21' and 22'.

In the embodiment of FIGURE 4, all features are the same as in FIGURE 3 as indicated by the same reference numerals, except that an originally circular cross-section or O-ring type of spring loading portion ring member 23" is employed instead of the rectangular cross-section ring member 23' of FIGURE 3. This loading ring member 23" is of a normal inside diameter which is slightly less than the diameter of the shoulder member flange diagonal surface 35 in the assembled relationship of the shoulder sealing ring member 21' about the shaft 7. Further, the cross-section of the loading ring member 23" is such that in the assembly it is placed under compression between the shoulder ring members 21' and 22' and more particularly between the diagonal face 38 of the shoulder ring member 22' and the opposing arcuate cradle surface 37 and the adjacent portions of the surfaces of the flanges 33 and 34, substantially as shown. Further, by virtue of the diagonal compression to which the loading ring member 23" is subjected between the shoulder ring seal members, it may engage against the cylindrical seal chamber surface 19 and thus afford sealing advantage supplemental to the seal face 29' of the shoulder sealing ring member 22'. It will be observed that a substantial annular area of the seal chamber 15 is afforded between the loading ring member 23" and the end face 18 of the hub 8. Hence, excess hydraulic pressure leaking into the seal chamber from the working chamber 9 not only acts on the loading ring 23" to enhance the spring loading thrust thereof toward the sealing ring member 21' and more particularly the radial flange 34 thereof, but also to act directly on the axial extending sealing flange 33.

In all versions of the seal structure, a minimum amount of space is required for the combination sealing effect against both internal and external leakage, by virtue of the diagonally opposite corner sealing relationship of the sealing structure. This actually enables the provision of a larger diameter and stronger shaft compared to hub diameter. In addition, the particular construction enables the seal to function as a hydraulic overload pressure relief shuttle valve and during which function there is an automatic increase in external leak-preventing sealing efficiency. Further, in all forms preferred, preloading is facilitated to attain optimum sealing results. Advantageous simplicity of form and assembly, as well as low cost are also attributes of the invention.

It will be understood that modifications and variations may be effected without departing from the scope of the novel concepts of the present invention.

We claim as our invention:

1. In a device including a housing having a pressure fluid chamber therein with a closure member at one end of the chamber having a journal bore therethrough and including a seal chamber counterbore at the chamber end of the bore, a shaft having a hub portion in said chamber and a smaller diameter portion extending through said journal bore, said hub portion having an end face coacting with said smaller diameter shaft portion to define with said counterbore an annular seal chamber, said seal chamber having surfaces which define with said end face and said smaller diameter shaft portion respective diagonally opposite juncture corners, and annular seal structure in said seal chamber having diagonally opposite shoulder portions engaging in said corners and a spring loading portion acting to thrust said shoulder portions sealingly toward said corners, whereby one of said shoulder portions provides an external leakage preventing seal between the end closure member and the smaller diameter portion of the shaft and the other of the shoulder portions provides an internal leakage preventing seal between said end face and the closure member.

2. In a device as defined in claim 1, said seal structure comprising a one-piece elastomeric ring in which said shoulder portions normally project to a predetermined greater distance than the the distance between said corners and in the assembly are compressed toward one another and thus place the spring loading portion under compression load.

3. A device as defined in claim 2, wherein said spring loading portion has at least one hole therethrough from side-to-side for equalization of pressure that may escape into the annular seal chamber.

4. A device as defined in claim 2, wherein the loading portion is of less width than the shoulder portions and affords a fluid receiving space within the seal chamber on the side of the loading portion which opposes said end face.

5. A device as defined in claim 1, wherein the shoulder portion sealingly thrusting into the juncture corner between the end member and the reduced diameter portion of the shaft has respective annular seal faces of substantial width engaging respectively against the end closure member and the shaft portion, and the annular sealing face which engages the shaft portion comprises part of an annular flange which extends beyond the adjacent side of the loading portion and is subject to thrust of fluid pressure that may escape into the seal chamber from the fluid chamber.

6. A device as defined in claim 1, wherein said shoulder portions comprise separate ring members having dihedral angle surface areas engaging in said corners and spaced apart opposing surfaces, and the spring loading portion comprises a ring member of elastomeric material engaging said opposed surfaces and maintained under compression in the assembly to effect said sealing thrust of said shoulder portions toward said corners.

7. A device as defined in claim 1, wherein said annular sealing structure affords with said end face an annular pressure relief sub-chamber within the seal chamber, and the end closure member is adapted to yield under excessive pressure loads in the fluid chamber whereby pressure relief leakage past the internal leakage shoulder portion into the pressure relief sub-chamber may occur.

8. In a rotary vane device including a housing providing a working chamber having abutment means stationary therein and a wing shaft within the housing and rotatable in the working chamber and having a vane cooperating with the abutment means in dividing the working chamber into sub-chambers,
the shaft having a portion of smaller diameter than the hub and projecting centrally therefrom with an end face surface on the hub about said shaft portion,
a closure member closing an end of the working chamber and having a central journal bore through which said shaft portion extends,
said closure member having a counterbore in the end of said journal bore adjacent said end face of the hub and defining an annular seal chamber with respective diagonally opposite juncture corners where surfaces defining said counterbore join the shaft portion and the end face,
and sealing means in the space defined by the counterbore having respective sealing shoulder portions and an intervening portion loading said shoulder portions to thrust into said corners.

9. A rotary vane device as defined in claim 8, wherein said loading portion comprises an elastomeric ring member maintained normally under compression between opposing faces on the shoulder portions, and said closure member is sufficiently yieldable under excessive pressure within the sub-chambers whereby pressure fluid leaks into the counterbore space and past the seal shoulder portion in the corner defined by the counterbore and said end face serving as a pressure relief valve between the sub-chambers and such pressure fluid thrusts against said sealing means to increase loading of the sealing shoulder portion engaging in the corner between the shaft portion and said adjacent counterbore surface.

10. In a device comprising two relatively rotatable members defining therebetween an annular seal chamber of quadrangular transverse cross-section and having four corners with diagonally opposite juncture corners liable to leakage therethrough between the members while the remaining corners present no leakage problem,
an annular sealing structure in the seal chamber having diagonally opposite shoulder portions engaging in said juncture corners and free and spaced from said remaining corners,
and a loading portion between and thrusting said shoulder portions toward and into said juncture corners.

11. In a device comprising two relatively rotatable members defining therebetween an annular seal chamber with diagonally opposite juntcure corners liable to leakage therethrough between the members,
an annular one-piece elastomeric sealing ring in said seal chamber and having diagonally opposite sealing thrust shoulder portions providing respective annular sealing faces of substantial width engaging surfaces defining said chamber and joining said corners,
and an integral spring loading portion joining and intervening between said shoulder portions and maintained normally under compression within the seal chamber to effect sealing thrust of said shoulder portions toward said corners.

12. A device as defined in claim 10, wherein said loading portion is or originally rectangular cross-section with diagonally opposite corner portions thrusting against said opposing surface of the shoulder portions.

13. A device as defined in claim 10, wherein said loading portion is of O-ring form having an initially substantially circular cross-section.

14. In a seal structure for sealing diagonally opposite joints in an annular seal chamber,
diagonally opposite sealing shoulder portions engageable in the juncture corners,
and a loading portion between and coactive with said shoulder portions to thrust them sealingly into the juncture corners,
said shoulder portions and said loading portion comprising parts of an integral elastomeric ring.

15. In a seal structure for sealing diagonally opposite joints in an annular seal chamber,
diagonally opposite sealing shoulder portions engageable in the juncture corners,
and a loading portion between and coactive with said shoulder portions to thrust them sealingly into the juncture corners,
said shoulder portions and said loading portion comprising parts of an integral elastomeric ring,
said loading portion having holes therethrough to establish a predetermined spring loading characteristic for the loading portion.

16. In a seal structure for sealing diagonally opposite juncture corners within a seal chamber,
a sealing shoulder portion to engage in one of said corners,
another sealing shoulder portion to engage in the opposite of the corners,
and a loading portion dimensioned to engage both of said shoulder portions and effect sealing thrust of the shoulder portions into the corners,
one of said shoulder portions having a cradling groove in which the loading portion is engageable.

17. In a seal structure for sealing diagonally opposite juncture corners within a seal chamber,
a sealing shoulder portion to engage in one of said corners,
another sealing shoulder portion to engage in the opposite of the corners,
and a loading portion dimensioned to engage both of said shoulder portions and effect sealing thrust of the shoulder portions into the corners, one of said shoulder portions having a cradling groove in which the loading portion is engageable, the other of said shoulder portions having a substantially flat diagonal face against which the loading portion is thrustingly engageable.

18. In a seal structure for sealing diagonally opposite joint corners in a rectangular seal chamber, a substantially triangular shoulder portion engageable in one of the corners, a substantially L-shaped cross-section sealing shoulder engageable in the opposite corner, and an elastomeric spring loading member engageable between and with both of said shoulder portions and acting to thrust the shoulder portions sealingly into said corners.

References Cited by the Examiner

UNITED STATES PATENTS

| | | | |
|---|---|---|---|
| 2,760,794 | 8/56 | Hartranft | 277—92 |
| 2,796,776 | 6/57 | Locke et al. | 92—121 |
| 2,954,012 | 9/60 | Curtis et al. | 92—125 |
| 3,103,281 | 9/63 | Rumsey et al. | 92—125 |

RICHARD B. WILKINSON, *Primary Examiner.*